(12) United States Patent
Ford et al.

(10) Patent No.: US 9,503,922 B1
(45) Date of Patent: Nov. 22, 2016

(54) WIRELESS NETWORK ABSTRACT MAINTENANCE COMMAND EXECUTION FRAMEWORK

(71) Applicant: Sprint Communications Company L.P., Overland Park, KS (US)

(72) Inventors: Justin L. Ford, Orlando, FL (US); Matthew D. Kurtz, Altamonte Springs, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/885,477

(22) Filed: Oct. 16, 2015

(51) Int. Cl.
*H04W 24/00* (2009.01)
*H04W 24/04* (2009.01)
*H04W 28/08* (2009.01)
*H04W 4/00* (2009.01)
*H04W 88/10* (2009.01)

(52) U.S. Cl.
CPC ............. *H04W 24/04* (2013.01); *H04W 4/003* (2013.01); *H04W 28/08* (2013.01); *H04W 88/10* (2013.01)

(58) Field of Classification Search
CPC ............. G06Q 10/08; G06Q 10/0631; G06Q 10/087; G06Q 20/203; H04L 43/00; H04L 43/0876; H04L 63/0421; H04L 67/22; H04L 67/1093; H04L 67/18; H04W 4/02
USPC ...................... 455/67.11, 67.14, 115.1, 115.2
See application file for complete search history.

(56) References Cited

U.S. PATENT DOCUMENTS

2012/0158553 A1\* 6/2012 Sudhidhanakul .... G06Q 10/087
705/28

\* cited by examiner

*Primary Examiner* — Ronald Eisner

(57) ABSTRACT

A communication network maintenance system. The system comprises an equipment inventory data store comprising cell tower equipment information, at least one processor, a memory, a command builder application, and a command executor application. The command builder application receives an abstract command identifying an abstract maintenance operation and a cell tower, looks up information about the cell tower in the inventory data store, based on the looked up information determines a specific command to execute on the cell tower using an element management system (EMS) associated with the cell tower, builds the specific command, and places the specific command on a queue. The command executor application retrieves the specific command from the queue, verifies a syntax of the specific command against the rules of the EMS associated with the specific command, checks that the specific command is authorized, and transmits the specific command to the EMS.

13 Claims, 3 Drawing Sheets

WIRELESS NETWORK ABSTRACT MAINTENANCE COMMAND EXECUTION FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication network may comprise a radio access network (RAN) and a core network which are communicatively coupled to one another. The RAN and core network may be maintained by a service provider and comprise a variety of network equipment items. These network equipment items in the service provider network may be manufactured by different vendors and original equipment manufacturers (OEMs). Network management systems (NMSs) or element management systems (EMSs) that are provided by different vendors to manage these items of network equipment may use different formats to represent state of the network equipment and have different operating procedures that differ from equipment item to equipment item, from a first EMS to a second EMS, or from a first NMS to a second NMS. When an issue arises on the service provider network, it may be difficult, inefficient, and time consuming to gather information such as vendor documents and experiment with methods to resolve the problem. Contributors assigned to troubleshoot the issue may be unfamiliar with the network equipment element and/or the nature of the issue that has occurred. The time spent on the trouble case may lead to more money and resources spent by a company to fix the problem.

SUMMARY

In an embodiment, a communication network maintenance system is disclosed. The method comprises a network equipment inventory data store, wherein the data store comprises information about cell tower equipment items, at least one processor, a non-transitory memory, a command builder application stored in the non-transitory memory, and a command executor application stored in the non-transitory memory. When executed by the at least one processor, the command builder application receives an abstract command identifying an abstract maintenance operation and identifying a cell tower that the abstract maintenance operation is to be performed on, wherein the abstract command is received from one of an alarm system, a network operations center (NOC) user interface, and a performance monitor and looks up information about the cell tower identified in the abstract command in the network equipment inventory data store. When executed by the at least one processor, the command builder application, based on the looked up information, further determines a specific command to execute on the cell tower using an element management system (EMS) associated with the cell tower, builds the specific command including parameter values determined based at least in part on the looked up information, and places the specific command on a command execution queue. When executed by the at least one processor, the command executor application retrieves the specific command from the command execution queue, verifies a syntax of the specific command against the rules of the EMS associated with the specific command, checks that the specific command is authorized, established a communication link to the EMS associated with the specific command, and transmits the specific command to the EMS.

In another embodiment, a communication network maintenance system is disclosed. The system comprises a network equipment inventory data store, wherein the data store comprises information about cell tower equipment items, at least one processor, a non-transitory memory, a command builder application stored in the non-transitory memory, and a command executor application stored in the non-transitory memory. When executed by the at least one processor, the command builder application receives an abstract command identifying an abstract maintenance operation and identifying a cell tower that the abstract maintenance operation is to be performed on, looks up information about the cell tower identified in the abstract command in the network equipment inventory data store, and, based on the looked up information determines a specific command to execute on the cell tower using an element management system (EMS) associated with the cell tower. The command builder application further checks that the specific command is authorized, builds the specific command including parameter values determined based at least in part on the looked up information, and places the specific command on a command execution queue. When executed by the at least one processor, the command executor application retrieves the specific command from the command execution queue, verifies a syntax of the specific command against the rules of the EMS associated with the specific command, rechecks that the specific command is authorized, establishes a communication link to the EMS associated with the specific command, and transmits the specific command to the EMS.

In yet another embodiment, a method of maintaining a wireless network equipment item is disclosed. The method comprises receiving by an application executing on a computer system an abstract command identifying an abstract maintenance operation to be performed on a cell tower, looking up the cell tower identified in the abstract command by the application in a network equipment inventory data store, where the data store comprises information about cell tower equipment items, and, based on the looked up information, building a specific command string by the application. The method further comprises checking by the application that the specific command string is authorized, placing by the application the specific command string on a command queue, retrieving the specific command string from the command queue by a worker application, checking by the worker application that a command associated with the specific command string is allowed for the cell tower, verifying a syntax of the specific command string by the worker application, and transmitting the specific command string by the worker application to an element management system (EMS) associated with the cell tower.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
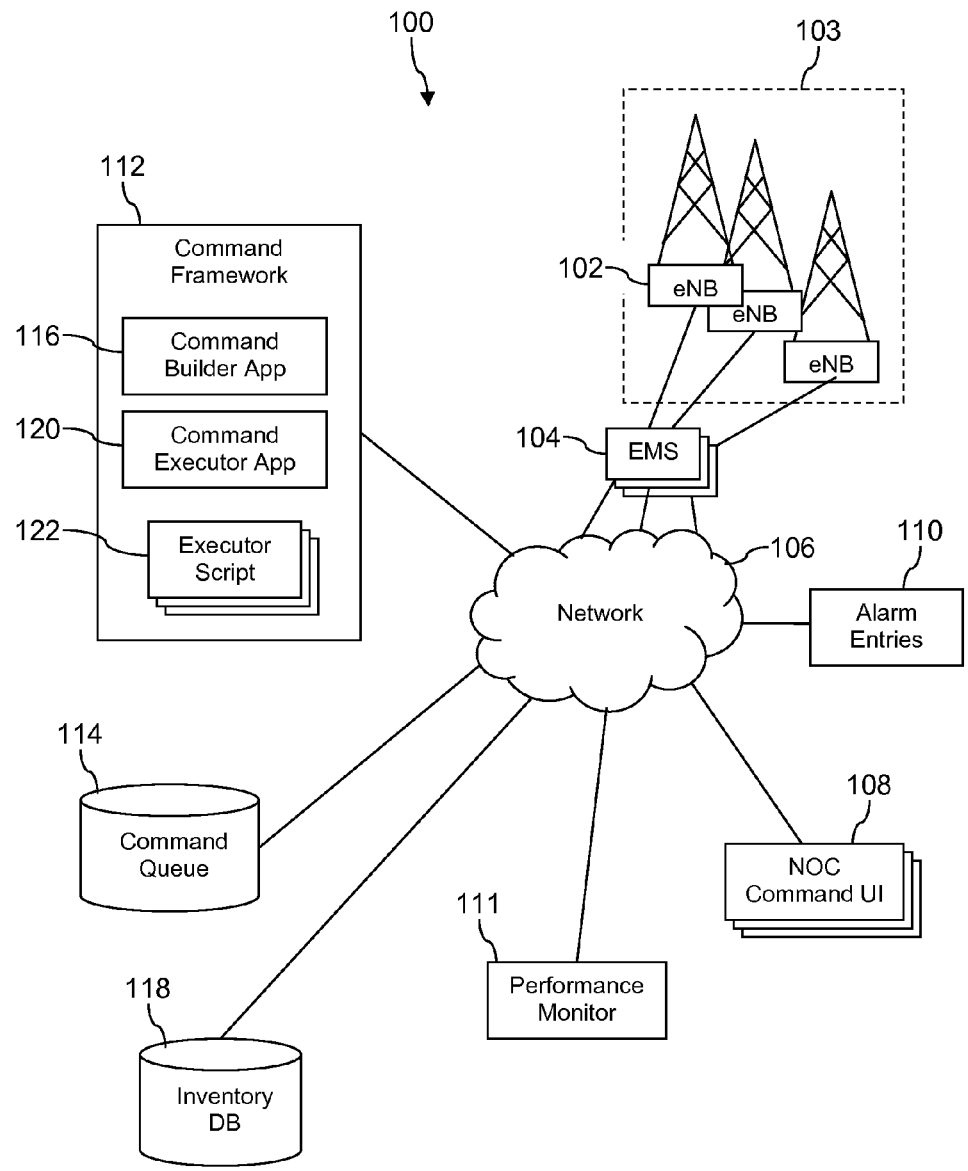
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communication network infrastructure is built and maintained by a communication service provider that operates the network to charge fees to customers (e.g., service subscribers). This infrastructure is very complicated and requires a very large capital investment. For example, a wireless communication service provider may own and operate more than 40,000 cell towers distributed across the United States connected and supported by a large number of core network elements such as routers, switches, gateways, and application servers. To succeed in this business, it is desirable that the service provider operate the network infrastructure efficiently while providing a high quality of service to customers at an affordable cost. The service provider may use a variety of automated tools to operate, monitor, and maintain the network infrastructure.

The network infrastructure may comprise network equipment items or network elements that are manufactured by a variety of different original equipment manufacturers (OEMs). OEMs may provide element management systems (EMSs) to maintain and operate network elements or network equipment items that they sell to the service provider. For example, an OEM of an enhanced node B (eNB) or of a cell tower may provide an EMS for maintaining and operating the eNB. The EMS may provide a variety of functions such as identifying installed equipment at each eNB, querying current status of equipment items at each eNB, changing adjustments and/or configuration parameters associated with equipment items at each eNB, resetting equipment items at each eNB, and the like.

Because a service provider network may comprise network elements manufactured by a plurality of OEMs, the service provider may use a plurality of different EMSs to maintain and operate the network infrastructure. Some cell sites comprise a mix of OEM equipment, and hence multiple EMSs may be used to operate and maintain the same cell site. It may happen in some circumstances that a network operations center (NOC) employee tasked with maintaining a given cell site may log in to three EMSs concurrently to troubleshoot and overcome a performance issue with the cell site. It is likely that the different EMSs provide different commands for similar functions and that the different commands may be associated with dissimilar command parameters or variables. Additionally, different EMSs may enforce different rules and/or restrictions on the commands they support, and it may be difficult for NOC workers to remember those different restrictions, particularly during stressful situations when an important cell site is experiencing performance problems.

The current disclosure teaches an abstract command execution framework for operating and maintaining network elements and/or network equipment items. The command execution system receives an abstract command that identifies a network element, for example a cell site or a component of a cell site. The abstract command may be submitted by a NOC user interface or by another source, for example from a performance monitoring application. The abstract command may identify an abstract maintenance operation. The system searches a network equipment inventory data store to get information about the network element. The information may indicate an EMS (e.g., one of a plurality of EMSs in the subject network infrastructure) that is configured to operate and maintain the subject network element. Based on the indicated EMS, the system may look up a version of the EMS software and based on the EMS and the version of the EMS software map the abstract command to a specific command supported by the indicated EMS. The syntax and format of commands may be different among the plurality of EMSs in the network infrastructure.

The system performs one or more checks to determine if the specific command is authorized or valid. The checks may include verifying that a user or a system (e.g., a performance monitoring application) that issued the abstract command has permission to execute the specific command. The checks may include verifying that the network element involved currently supports the specific command. The checks may include verifying that mandatory parameter values are provided. For example, the system may not support a command to reset a remote radio head (RRH) that does not identify a specific RRH of a plurality or RRHs at a cell site or does not identify a specific sector of an RRH. It is noted that the EMS may support such a powerful command, but the system, as a way of protecting the NOC user and avoiding unnecessary degradation of communication service to wireless communication service subscribers, prohibits such an unrestricted command and may mandate the identification of a specific RRH among many. The system may further extract command parameter values from the network equipment inventory data store and automatically populate those values into the parameter values.

If the checks completed successfully, the command execution system builds a command string comprising any desired command parameter values and places the command string on a command execution queue. In an embodiment, the command strings on the command execution queue may indicate a priority level of the command. Alternatively, different commands that may be identified by command strings have a known priority level (e.g., defined in software routines, defined in data files). The command execution system may work the command strings on the queue according to the priority level associated with the commands and according to schedules defined for the commands. A high priority command may not be selected from the command execution queue to process before a low priority command, if the high priority command is scheduled to run an hour later while the low priority command is meant to be run as soon as possible while observing priority level precedence. If two commands are ready to run, the command with the higher priority level will be taken off the command execution queue before the command with the lower priority level. Also, a command taken off the command execution queue for processing may execute after a different command taken off the command execution queue for processing later, for example when there may be an execution delay or time lag on the EMS that performs the corresponding concrete command or action on the network equipment item.

The command execution system may take command strings off the queue and organize them or sort them according to the EMS that each command string is targeted to. The command strings for different EMSs may be worked independently by the system, for example worked by independent processes and/or worked by independent threads. Some commands may be meant for execution as soon as possible. Other commands may be associated with a scheduled execution time. Before sending a command string to an EMS for execution, the commands are again checked. For example, between the time the command string was built and added to the queue, the status of the network element that is the target of the command may have changed and the previously valid command may now be, in the context of the current status of the network element, invalid. The syntax of the specific command may be verified against syntax rules of the EMS associated with this specific command, for example based on syntax checking logic built into the command execution system. If the final checks are OK, the system establishes a communication link to the EMS and sends the command string and any associated parameters to the EMS. The EMS then may execute the command string and operate or maintain the network element accordingly.

Abstract commands may be inserted into the abstract command execution system from a variety of different sources. An alarm system may build command strings and place them on the queue. The NOC user interface may send abstract commands as described above. A performance monitoring system may build command strings and place them on the queue, for example taking automated action when the monitored performance of a network element falls outside of performance limits or thresholds.

The command execution system described herein consolidates, translates, queues, and checks commands received from multiple sources and causes them to be executed by multiple different EMSs targeted to multiple different network elements and/or cell towers. The system makes the job of NOC workers easier, less stressful, less complicated, and less error prone. The system easily adapts to newly incorporated network elements and/or different EMSs associated with newly incorporated network elements.

Turning now to FIG. 1, a system 100 is described. In an embodiment, system 100 comprises a plurality of enhanced node Bs (eNBs) 102 which may also be referred to as base transceiver stations (BTSs) or cell towers. The eNBs 102 are part of a radio access network 103. The radio access network 103 comprises other equipment such as cell site routers, mobility management entities (MMEs), internet protocol aggregators (IPAs), routers, and other network elements and/or components. The eNBs 102 and other elements of the RAN 103 may be configured, monitored, and maintained from a plurality of element management systems (EMS) 104. The eNBs 102 or cell towers may provide wireless communication links to user equipment (UEs) (not shown) such as mobile smart phones, wearable computers, headset computers, laptop computers, notebook computers, tablet computers, and other wireless communication devices. The eNBs 102 or cell towers may support one or more of a long term evolution (LTE) wireless protocol, a code division multiple access (CDMA) wireless protocol, a global system for mobile communication (GSM) wireless protocol, or a worldwide interoperability for microwave access (WiMAX) wireless protocol.

It may be that the eNBs 102, the various elements or components that the eNBs 102 are comprised of, and the other elements of the RAN 103 are provided by a plurality of different original equipment manufacturers (OEMs), and each different OEM may provide its own EMS 104 to manage its elements and/or components. It is understood that the commands and command syntax of EMSs 104 from each OEM may differ substantially. The EMSs 104 are coupled to a communication network 106 and may be accessed via the network 106 from a command framework 112. The command framework 112 may generate specific commands based on abstract commands entered from a plurality of network operation center (NOC) command user interfaces 108, based on alarms provided by alarm entries 110, or based on inputs provided by a performance monitor 111.

In an embodiment, the command framework 112 is a computer system. Computer systems are described further herein after. The command framework 112 comprises a command builder application 116, a command executor application 120, and a plurality of executor scripts 122 stored in a non-transitory memory of the command framework 112 and executed by a processor of the command framework 112. The command builder application 116 receives command inputs from the NOC command UI 108, from the alarm entries 110, and from the performance monitor 111. The command builder application 116 builds commands and places them on a command execution queue 114. The command executor application 120 takes the commands off the command execution queue 114, processes them in part, and sends the intermediately processed commands to the executor scripts 122 to send the processed commands to the appropriate one of the EMSs 104 for execution on the appropriate eNB 102. Instances of the executor scripts 122 may be created by the command executor application 120 to execute individual commands or a plurality of commands (i.e., by invoking a specific command on the appropriate EMS 104).

Commands may be built by the command builder application 116 to be placed on the command execution queue 114 for execution at a later and/or scheduled time. The command builder application 116 receives an abstract command that identifies a command and a network element. The command builder application 116 accesses an inventory datastore 118 that identifies all the elements associated with the eNBs 102 and other network elements of the RAN 103. In an embodiment, the inventory datastore 118 is rebuilt daily from data read from the cell towers. This may increase the likelihood that the inventory data is up-to-date and accurate.

The command builder application 116 uses the element identification received with the abstract command to look up information to be used in building the specific command to be performed by the appropriate EMS 104. The information may comprise a software version of the subject element, a pathway to the subject element, and topological equipment relationships associated with the subject element. The command builder application 116 identifies which EMS 104 and what version of EMS software the subject command will be directed to.

The command builder application 116 determines or checks if the specific command can be executed on the subject element of the RAN 103. This check may involve determining if a user associated with the NOC command UI 108 has user permissions to execute the specific command. This check may involve determining if the EMS 104 and/or the element are in a current state that supports the specific command (e.g., is automation enabled). This check may involve determining if information about the subject element is contained in the inventory datastore 118. If the command cannot be executed, a response is returned to the NOC command UI 108 and a log is created and stored in a history datastore (not shown). This check may entail searching the command execution queue 114 to determine if the specific command has already been built and scheduled for execution, for example by another NOC employee. This check may entail determining if the number of automation actions taken with reference to the subject element or a system that contains the element exceeds a threshold of automated actions per unit of time. For example, in an embodiment, if 10 automation actions have been taken on an eNB 102 within the same 24 hour period, an additional command or automation request may be rejected.

This may entail determining if the requested command is unsafe for some reason. For example, a command to reset an eNB 102 that does not designate a specific radio head (RH) or some other specific equipment may be deemed unsafe or too aggressive and may be rejected. Thus, the command framework 112 can provide a check on NOC employees and reduce the opportunity for a stressed or inexperienced NOC employee damaging the RAN 103 and/or spoiling the communication experience for some wireless communication service subscribers.

If the command is not prohibited, the command builder application 116 looks up the syntax of the specific command associated with the EMS 104 that is associated with the subject command. The syntax may refer to both the name of the command (i.e., the textual string used to invoke the command on the EMS 104) and the parameter list for the command. The command builder application 116 infers the information to be included in the parameter list for the specific command based on information read from the inventory datastore 118 and fills out the parameters with the appropriate values. In other words, the command builder application 116 performs automatic matching of specific command parameters, based on information obtained from the inventory datastore 118. Thus, the command framework 112 can reduce the workload and learning curve for NOC employees to perform the specific commands (e.g., the employees need not remember or painstakingly look up specific command syntaxes and information to fill parameters). In an embodiment, the command builder application 116 also looks up login information for the subject EMS 104 and bundles this information with the specific command. The command builder application 116 places the specific command and any associated information on the command execution queue 114.

When a command is ready to be executed (some commands may be built to be run immediately while other commands may be built to be executed at or after a specified future time), the command executor application 120 retrieves the specific command and any associated information from the command execution queue 114. The command executor application 120 may check to see if a duplicate command or a repeat command (i.e., a command to perform the same automated action on the same element or component of the RAN 103 as the instant command would) is already being executed or has recently been executed. If so, the command is discarded. Based on the specific command and any associated information retrieved from the command execution queue 114, the command executor application 120 rebuilds the specific command. The rebuilding of the specific command may promote greater security in some circumstances. The command executor application 120 determines whether automation is enabled for the element that is the subject of the specific command at the current time. This may entail checking through the EMS 104 associated with the subject component or reading a current state of the subject component in the inventory datastore 118. If automation for the element is now disabled, the specific command fails and the failed results are logged accordingly. If automation is enabled for the element, an executor script 122 is created to perform the specific command.

In an embodiment, the command executor application 120 comprises separate worker processes for each of a plurality of EMSs 104. The command executor application 120 may create or fork a separate worker process to feed specific commands to each EMS 104. In some circumstances this structure may have advantages. For example, some EMSs 104 may constrain command execution to one command at a time on a given element. When this is the case, the worker process associated with that EMS 104 can sequence specific commands sent from the worker process to the EMS 104 so as to observe the element constraint. As another example, separate worker processes may provide load balancing of specific commands across the elements managed by a specific EMS 104. The worker processes may support detection and prevention of duplicated or repeated commands. The worker processes may create the executor scripts 122 mentioned above. The command executor application 120 may sort specific commands stored on the command execution queue 114 according to which EMS 104 the commands are associated to and distribute them to the executor scripts 122 based on that sorting. Said in other words, the command execution queue 114 may comprise multiple sub-queues, one sub-queue associated with each different EMS 104.

Each executor script 122 checks that the specific command defines a valid command path and conforms to valid syntax for the subject EMS 104. If the checks do not succeed, the specific command fails and an appropriate log is generated and stored. If the checks do succeed, the executor script 122 establishes a communication link with the appropriate EMS 104, sends the command to the EMS 104, and logs the response of the EMS 104 to the command. In an embodiment, the executor script 122 established a secure tunnel as the communication link with the EMS 104. The executor script 122 then terminates.

It is understood that a wide variety of commands may be supported by the command framework 112 and the EMSs 104. Some example commands are reset a remote radio head (RRH), retrieve an alarm list, retrieve an alarm log, retrieve a command history, retrieve a subsystem status, retrieve UE counts, show interface status, reset GPS (each cell site has a global positioning system receiver), reset EAIU (external alarm interface unit: equipment item that manages equipment cabinet alarms such as cabinet door open alarm, cabinet temperature too high, etc.), reset UMP (universal main processor: a management card of an eNB), reset a cell site router, adjust antenna tilt of an eNB 102, adjust a transmit power level of an eNB 102. In an embodiment, the performance monitor 111 may monitor key performance indicators associated with the eNBs 102 and/or associated with other network elements in the RAN 103. When the key performance indicators drop below (or exceed) a predefined threshold, the performance monitor 111 may automatically generate an abstract command and place it on the command execution queue 114. The performance monitor 111 may automatically generate an abstract command in response to a pattern of key performance indicator values and place the abstract command on the command execution queue 114 for further processing. Alternatively, the performance monitor may send the abstract command to the command builder application 116 for processing, generation of a specific command based on the abstract command and an identified element, and place the specific command on the command execution queue 114.

The command framework 112 may create command log entries and/or command histories. For example, a first log may be maintained that records the abstract commands and whether the command was acted upon (i.e., passed various checks). A second log may be maintained that records the whole lifecycle of each command as it is built, checked, rebuilt, rechecked, transmitted to an EMS 104, and completed. The command builder application 116 and the command executor application may review one or both logs to avoid duplicate or repeat commands.

Figure 2:
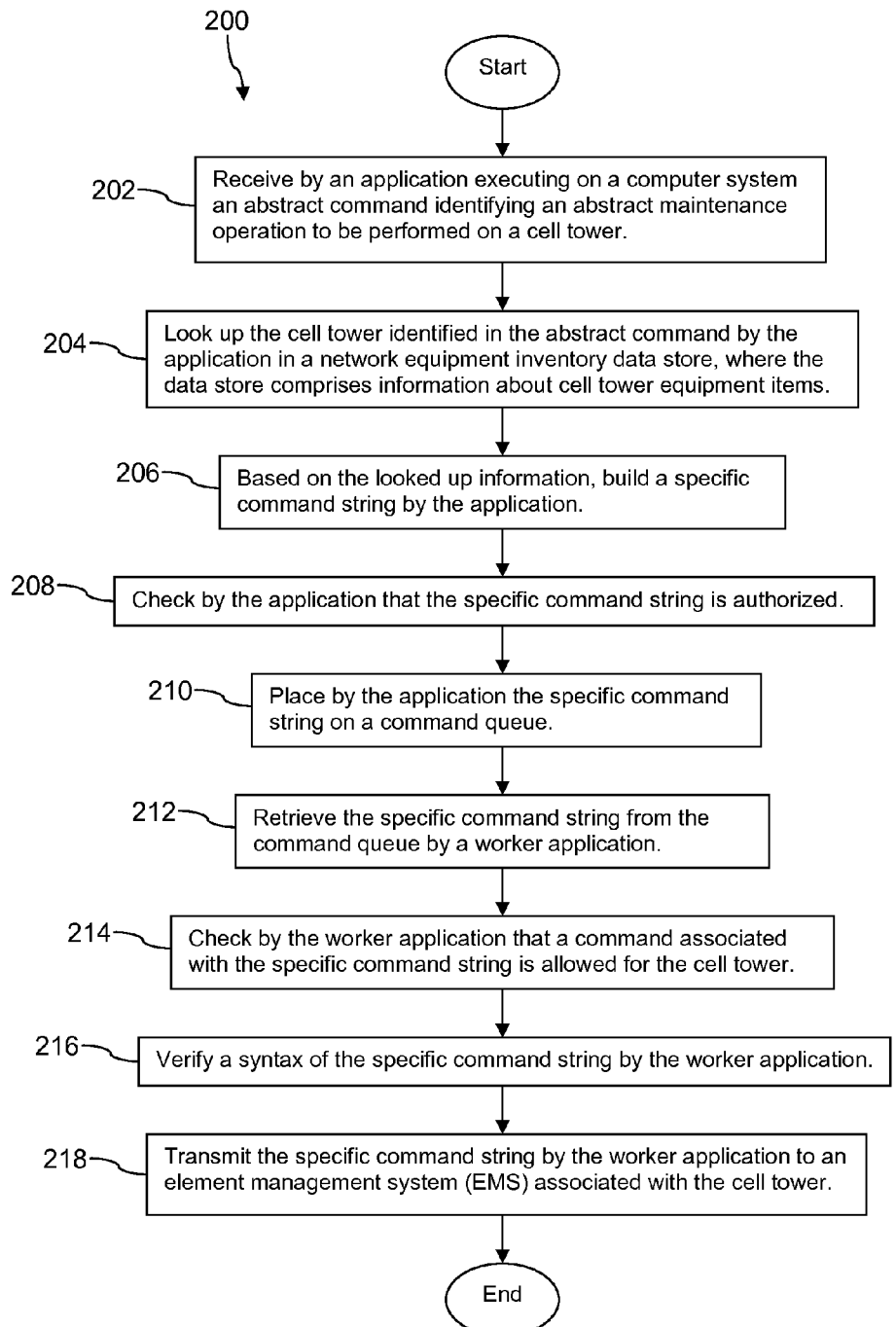
FIG. 2 is a flow chart of a method according to an embodiment of the disclosure.

Turning now to FIG. 2, a method 200 is described. At block 202, an application executing on a computer system receives an abstract command identifying an abstract maintenance operation to be performed on a cell tower or other network element. The abstract command may be received from a NOC user interface, such as the NOC command UI 108, or from the performance monitor 111. At block 204, the cell tower or other network element identified in the abstract command is looked up by the application in a network equipment inventory data store, where the data store comprises information about cell tower equipment items and about other network element equipment items. The looked up information may comprise an identity of an EMS 104 associated with the equipment items, a revision identity of the EMS software, a command syntax of a specific command corresponding to the abstract command, and values that may be populated into parameters of the specific command. At block 206, based on the looked up information, a specific command string is built by the application. This may comprise automatically populating value into parameter values of the specific command. At block 208, the application checks that the specific command string is authorized.

At block 210, the application places the specific command string on a command queue. At block 212, a worker application retrieves the specific command string from the command queue. At block 214, the worker application checks that a command associated with the specific command string is allowed for the cell tower. At block 216, the worker application verifies a syntax of the specific command string. At block 218, the worker application transmits the specific command string to an element management system (EMS) associated with the cell tower.

Figure 3:
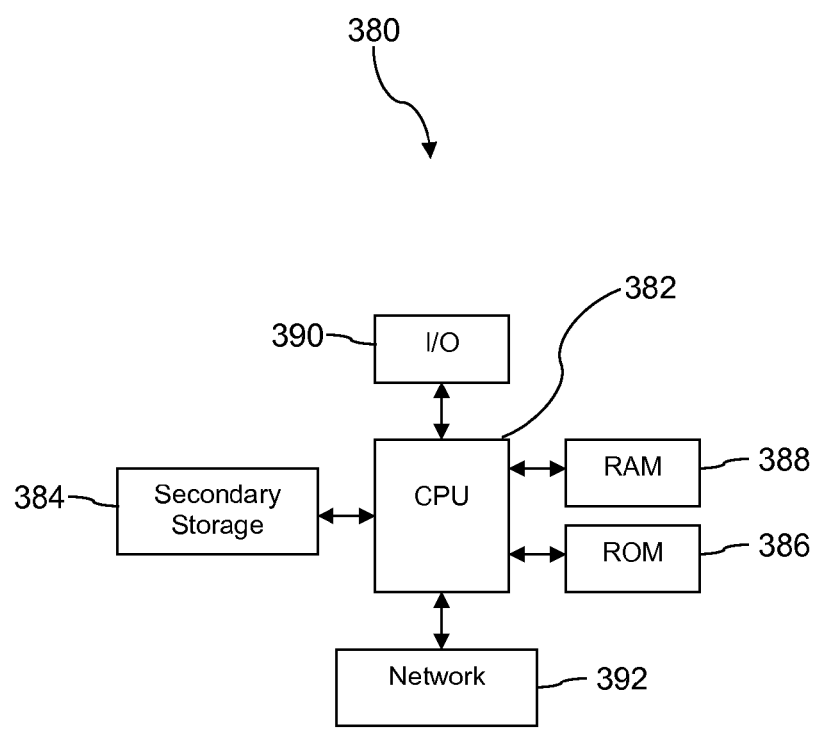
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication network maintenance system, comprising:
    a network equipment inventory non-transitory data store, wherein the network equipment inventory non-transitory data store comprises information about cell tower equipment items;
    at least one processor;
    a non-transitory memory;
    a command builder application stored in the non-transitory memory that, when executed by the at least one processor,
    receives an abstract command identifying a maintenance operation and identifying a cell tower that the maintenance operation is to be performed on, wherein the abstract command is received from one of an alarm system, a network operations center (NOC) user interface, and a performance monitor,
    looks up, in the network equipment inventory non-transitory data store, information about the cell tower identified in the abstract command,
    based on the looked up information, determines a specific command to execute on the cell tower, the execution using an element management system (EMS) associated with the cell tower,
    builds the specific command, the specific command including parameter values determined based at least in part on the looked up information, and
    places the specific command on a command execution queue; and
    a command executor application stored in the non-transitory memory that, when executed by the at least one processor,
    retrieves the specific command from the command execution queue,
    verifies a syntax of the specific command against the rules of the EMS associated with the specific command,
    checks that the specific command is authorized,
    establishes a communication link to the EMS associated with the specific command, and
    transmits the specific command to the EMS.

2. The system of claim 1, wherein the network equipment inventory non-transitory data store is rebuilt daily from data read from cell towers.

3. The system of claim 1, wherein the command builder application rejects an abstract command identifying a reset command for a cell tower that does not identify a specific radio head (RH) of the cell tower.

4. The system of claim 1, wherein the command builder application checks for a command stored on the command execution queue that duplicates the abstract command before building the specific command.

5. The system of claim 1, wherein the NOC user interface provides abstract commands for current execution and abstract commands for scheduled execution.

6. The system of claim 1, wherein checking that the specific command is authorized comprises the command executor application checking if the cell tower enables the specific command and if the EMS enables the specific command.

7. A communication network maintenance system, comprising:
    a network equipment inventory non-transitory data store, wherein the network equipment inventory non-transitory data store comprises information about cell tower equipment items;
    at least one processor;
    a non-transitory memory;
    a command builder application stored in the non-transitory memory that, when executed by the at least one processor,
    receives an abstract command identifying a maintenance operation and identifying a cell tower that the maintenance operation is to be performed on,
    looks up, in the network equipment inventory non-transitory data store, information about the cell tower identified in the abstract command,
    based on the looked up information, determines a specific command to execute on the cell tower, the execution using an element management system (EMS) associated with the cell tower,
    checks that the specific command is authorized,
    builds the specific command, the specific command including parameter values determined based at least in part on the looked up information, and
    places the specific command on a command execution queue; and
    a command executor application stored in the non-transitory memory that, when executed by the at least one processor,
    retrieves the specific command from the command execution queue,
    verifies a syntax of the specific command against rules of the EMS associated with the specific command,
    rechecks that the specific command is authorized,
    establishes a communication link to the EMS associated with the specific command, and
    transmits the specific command to the EMS.

8. The system of claim 7, wherein the network equipment inventory non-transitory data store comprises information about cell tower equipment items manufactured by a plurality of original equipment manufacturers (OEMs) and wherein the command builder application is configured to build specific commands to execute on cell towers using a plurality of EMSs.

9. The system of claim 8, wherein the command builder application is configured to build a first specific command for execution using a first EMS based on a first abstract command and to build a second specific command for execution using a second EMS based on the first abstract command, where the first specific command is different from the second specific command.

10. The system of claim 8, wherein the command executor application sorts specific commands stored on the command execution queue according to which EMS the specific command is associated.

11. The system of claim 7, wherein the communication link established to the EMS associated with the specific command is a secure tunnel.

12. The system of claim 7, wherein checking that the specific command is authorized comprises the command builder application checking to see if a cell tower equipment item associated with the specific command supports the specific command.

13. The system of claim 7, wherein checking that the specific command is authorized comprises the command builder application checking to see if a user associated with the abstract command has permission to execute the specific command.

\* \* \* \* \*